(12) United States Patent
Nishi

(10) Patent No.: US 7,117,084 B2
(45) Date of Patent: Oct. 3, 2006

(54) APPARATUS AND SYSTEM FOR PROCESSING MEASUREMENT DATA

(75) Inventor: Hirotaka Nishi, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 222 days.

(21) Appl. No.: 10/867,325

(22) Filed: Jun. 14, 2004

(65) Prior Publication Data
US 2004/0260460 A1 Dec. 23, 2004

(30) Foreign Application Priority Data
Jun. 20, 2003 (JP) .............................. 2003-176501
May 10, 2004 (JP) .............................. 2004-139596

(51) Int. Cl.
G08G 1/097 (2006.01)
G08G 1/123 (2006.01)
G01C 21/26 (2006.01)

(52) U.S. Cl. ...................... 701/201; 701/209; 701/117; 340/995.13; 340/995.14; 342/357.08; 342/357.1

(58) Field of Classification Search ................ 701/201, 701/208, 209, 117, 2; 340/992, 993, 995.13, 340/995.12; 342/357.09, 357.1; 455/414.2, 455/414.3
See application file for complete search history.

(56) References Cited

U.S. PATENT DOCUMENTS

| | | | | |
|---|---|---|---|---|
| 5,317,311 A * | 5/1994 | Martell et al. | ............... | 340/905 |
| 5,889,477 A * | 3/1999 | Fastenrath | ................... | 340/905 |
| 6,317,682 B1 * | 11/2001 | Ogura et al. | ................. | 701/117 |
| 6,594,576 B1 * | 7/2003 | Fan et al. | .................... | 701/117 |
| 6,804,524 B1 * | 10/2004 | Vandermeijden | ............ | 701/117 |
| 6,804,602 B1 * | 10/2004 | Impson et al. | .............. | 701/117 |
| 6,988,032 B1 * | 1/2006 | Chiang | ........................ | 701/117 |
| 2002/0145541 A1 * | 10/2002 | Matsui et al. | ............... | 701/117 |

* cited by examiner

Primary Examiner—Tan Q. Nguyen
(74) Attorney, Agent, or Firm—RatnerPrestia

(57) ABSTRACT

A vehicle apparatus mounted on a vehicle measures data of the vehicle, a roadside apparatus provided correspondingly to a moving region where the vehicle is to move, and a center station for receiving the data processed at the roadside apparatus. The roadside apparatus comprises a road-to-vehicle communicating section for receiving the measurement data from the vehicle apparatus, a measurement-data storing section for storing the measurement data received at the road-to-vehicle communicating section, a measurement-data summarizing section for summarizing the measurement data stored in the measurement-data storing section, and a roadside-to-center communicating section for sending the summarization measurement data summarized by the measurement-data summarizing section to the center station.

8 Claims, 7 Drawing Sheets

FIG. 5.

| Travel Route | | Travel Time (second) | | | | |
|---|---|---|---|---|---|---|
| | | Section A-C | Section B-C | Section D-C | Section C-E |
| Section A-E | Vehicle 101 | 14 | | | 16 |
| | Vehicle 102 | 43 | | | 18 |
| | Vehicle 103 | 51 | | | 20 |
| | Vehicle 104 | 404 | | | 16 |
| | Vehicle 105 | 102 | | | 14 |
| | Vehicle 106 | 16 | | | 14 |
| | Vehicle 107 | 62 | | | 25 |
| | Vehicle 108 | 15 | | | 17 |
| Section B-E | Vehicle 109 | | 62 | | 22 |
| | Vehicle 110 | | 20 | | 18 |
| | Vehicle 111 | | 21 | | 19 |
| | Vehicle 112 | | 54 | | 21 |
| | Vehicle 113 | | 35 | | 27 |
| Section D-E | Vehicle 114 | | | 24 | 21 |
| | Vehicle 115 | | | 44 | 18 |
| | Vehicle 116 | | | 74 | 29 |

APPARATUS AND SYSTEM FOR PROCESSING MEASUREMENT DATA

FIELD OF THE INVENTION

The present invention relates to an apparatus and system for processing measurement data, such as a roadside apparatus, for receiving measurement data as measured on a mobile, or vehicle, in movement and then sending the received measurement data to another apparatus, or center station.

BACKGROUND OF THE INVENTION

Conventionally, there is known a roadside apparatus of this kind described in the publication of JP-A-7-334786, for example.

In the roadside apparatus described in this document, the measurement data from a traveling vehicle, or mobile, is received by a road-to-vehicle communicating means. The measurement data received from each traveling vehicle is immediately sent directly to another road-information summarizing apparatus, e.g. center apparatus.

However, with such a conventional roadside apparatus, when sending the measurement data received from each mobile to the road-information collecting apparatus such as a center apparatus, no process is made to reduce the amount of data. In the event of a spread of the mobiles to send measurement data to a roadside apparatus, there encounters an increase of the data to be sent from the roadside apparatus to the road-information collecting apparatus in proportion to the increase in the number thereof. This raises a problem of transmission trouble in terms of the speed and capacity of transmission.

SUMMARY OF THE INVENTION

The present invention has been made in order to solve the problems on the prior art. It is an object of the invention to provide an apparatus and system for processing measurement data that, even in the event of a spread of the mobiles to send measurement data to the measurement-data processing apparatus such as the roadside apparatus, there is no increase in amount of the data to be sent to another apparatus such as the road-information collecting apparatus, in proportion to the number thereof.

A measurement data processing apparatus of the present invention comprising: receiving means for receiving measurement data measured at a mobile; measurement data storing means for storing measurement data received by the receiving means; and measurement data summarizing means for summarizing measurement data stored by the measurement data storing means. This can summarize the data received from a mobile to be sent to another apparatus.

Meanwhile, in a measurement data processing apparatus of the invention, the measurement data summarizing means comprises section dividing means for extracting a movement path of the mobile from the measurement data and dividing the movement path extracted into sections, and section data summarizing means for summarizing the measurement data based on the section divided. Due to this, it is possible to carry out a summarization process according to a moving status of the mobiles in each section.

Meanwhile, in a measurement data processing apparatus of the invention, the measurement data summarizing means comprises noise removing means for removing noise contained in the measurement data. Due to this, summarization is possible with noise removal from data.

Meanwhile, in a measurement data processing apparatus of the invention, there is further comprised of sending means for sending summarization measurement data summarized by the measurement data summarizing means to another apparatus. Due to this, the summarization measurement data by the measurement data summarizing means can be sent to another apparatus.

Meanwhile, a measurement data processing apparatus of the invention, the measurement data processing apparatus is provided corresponding to a movement region where the mobile is to move. Due to this, data can be measured based on a movement path of the mobile.

Furthermore, a measurement data processing system having a mobile apparatus mounted on a mobile and for measuring data at the mobile, and a measurement data processing apparatus for processing data measured at the mobile, the mobile apparatus comprising: measurement data acquiring means for acquiring measurement data measured at the mobile; and mobile transmitting means for sending the measurement data acquired by the measurement data acquiring means to the measurement data processing apparatus; and the measurement data processing apparatus comprising: data processing apparatus receiving means for receiving the measurement data sent from the mobile apparatus; measurement data storing means for storing the measurement data received by the data processing apparatus receiving means; and measurement data summarizing means for summarizing the measurement data stored in the measurement data storing means. Due to this, even in the event of spread of the mobile, it is possible to summarize the measurement data received from the mobile and to be sent to the measurement-data processing apparatus.

Meanwhile, in a measurement data processing system of the invention, the measurement data summarizing means comprises section dividing means for extracting a movement path of the mobile from the measurement data and dividing the movement path extracted into sections, and section data summarizing means for summarizing the measurement data based on the section divided. Due to this, it is possible to carry out a summarization process according to a moving status of the mobiles in each section.

Meanwhile, in a measurement data processing system of the invention, the measurement data summarizing means comprises noise removing means for removing noise contained in the measurement data. Due to this, summarization is possible with noise removal from data.

Meanwhile, in a measurement data processing system of the invention, the measurement data processing apparatus is provided correspondingly to a movement region where the mobile is to move. Due to this, data measurement and summarization is possible according to a movement path of the mobile.

Meanwhile, in a measurement data processing system of the invention, there is further comprised of a measurement data transfer apparatus provided between the mobile apparatus and the measurement data processing apparatus and for transferring data measured at the mobile to the measurement data processing apparatus. Due to this, it is possible to summarize the measurement data transferred by the measurement-data transfer apparatus.

Furthermore, a measurement data processing system of the invention has a mobile apparatus mounted on a mobile and for measuring data at the mobile, a first measurement data processing apparatus for processing the data measured at the mobile, and a second measurement data processing apparatus for processing the data processed by the first measurement data processing apparatus, the mobile apparatus comprising: measurement data acquiring means for acquiring measurement data measured at the mobile; and mobile transmitting means for sending the measurement data acquitted by the measurement data acquiring means to the first measurement data processing apparatus; the first measurement data processing apparatus comprising: first processing apparatus receiving means for receiving the measurement data sent from the mobile apparatus; first processing apparatus storing means for storing the measurement data received by the first processing apparatus receiving means; first processing apparatus summarizing means for summarizing the measurement data stored in the first processing apparatus storing means; and first processing apparatus transmitting means for sending the summarization measurement data summarized by the first processing apparatus summarizing means to the second measurement data processing apparatus; the second measurement data processing apparatus comprising: second processing apparatus receiving means for receiving the summarization measurement data sent from the first measurement data processing apparatus; and processing means for processing the summarization measurement data received by the second processing apparatus receiving means. Due to this, even in the event of a spread of the mobiles, it is possible for the first measurement data processing apparatus to summarize the measurement data received from the mobile and to be sent to the second measurement-data processing apparatus.

Meanwhile, in a measurement data processing system of the invention, the first processing apparatus summarizing means comprises a section dividing means for extracting a movement path of the mobile from the measurement data and dividing the movement path extracted into sections, and section data summarizing means for summarizing the measurement data based on the section divided. Due to this, the first measurement data processing apparatus can carry out a summarization process according to a moving status of the mobiles in each section.

Meanwhile, in a measurement data processing system of the invention, the first processing apparatus summarizing means comprises noise removing means for removing noise contained in the measurement data. Due to this, the first measurement data processing apparatus can make a summarization by removing noise from data.

Meanwhile, in a measurement data processing system of the invention, the first measurement data processing apparatus is provided correspondingly to a movement region where the mobile is to move. Due to this, data measurement and summarization is possible according to a movement path of the mobile.

Furthermore, a measurement data processing system of the invention has a mobile apparatus mounted on a mobile and for measuring data at the mobile, a first measurement data processing apparatus provided correspondingly to a movement region where the mobile is to move, and a second measurement data processing apparatus for processing the data processed by the first measurement data processing apparatus, the mobile apparatus comprising: measurement data acquiring means for acquiring measurement data measured at the mobile; and mobile transmitting means for sending the measurement data acquitted by the measurement data acquiring means to the first measurement data processing apparatus; the first measurement data processing apparatus comprising: first processing apparatus receiving means for receiving the measurement data sent from the mobile apparatus; first processing apparatus storing means for storing the measurement data received by the first processing apparatus receiving means; first processing apparatus summarizing means for summarizing the measurement data stored in the first processing apparatus storing means; and first processing apparatus transmitting means for sending the summarization measurement data summarized by the first processing apparatus summarizing means to the second measurement data processing apparatus; the second measurement data processing apparatus comprising: second processing apparatus receiving means for receiving the summarization measurement data sent from the first measurement data processing apparatus; and second processing apparatus storing means for storing the summarization measurement data received by the second processing apparatus receiving means; and second processing apparatus summarizing means for further summarizing the summarization measurement data stored by the second processing apparatus storing means. Due to this, even in the event of a spread of the mobiles, it is possible for the first measurement data processing apparatus to summarize the measurement data received from the mobile and to be sent to the second measurement data processing apparatus, and for the second measurement data processing apparatus to summarize the summarization measurement data received from the first measurement data processing apparatus.

Meanwhile, in a measurement data processing system of the invention, the first or second processing apparatus summarizing means comprises section dividing means for extracting a movement path of the mobile from the measurement data and dividing the movement path extracted into sections, and section data summarizing means for summarizing the measurement data based on the section divided. Due to this, the first and second measurement data processing apparatuses can carry out a summarization process according to a movement status of the mobiles on the section.

Meanwhile, in a measurement data processing system of the invention, the first or second processing apparatus summarizing means comprises noise removing means for removing noise contained in the measurement data. Due to this, the first and second measurement data processing apparatus can summarize with noise removal from data.

Meanwhile, in a measurement data processing system of the invention, the first measurement data processing apparatus is provided correspondingly to a movement region where the mobile is to move. Due to this, the first and second measurement data processing apparatus can measure and summarize data according to a movement path of the mobiles.

BRIEF DESCRIPTION OF THE DRAWINGS

FIG. 5 is a figure showing measurement data in the roadside apparatus in embodiment 1 of the invention;

DESCRIPTION OF THE EXEMPLARY EMBODIMENT

Exemplary embodiments of the present invention are demonstrated hereinafter with reference to the accompanying drawings.

1. First Embodiment

Figure 1:
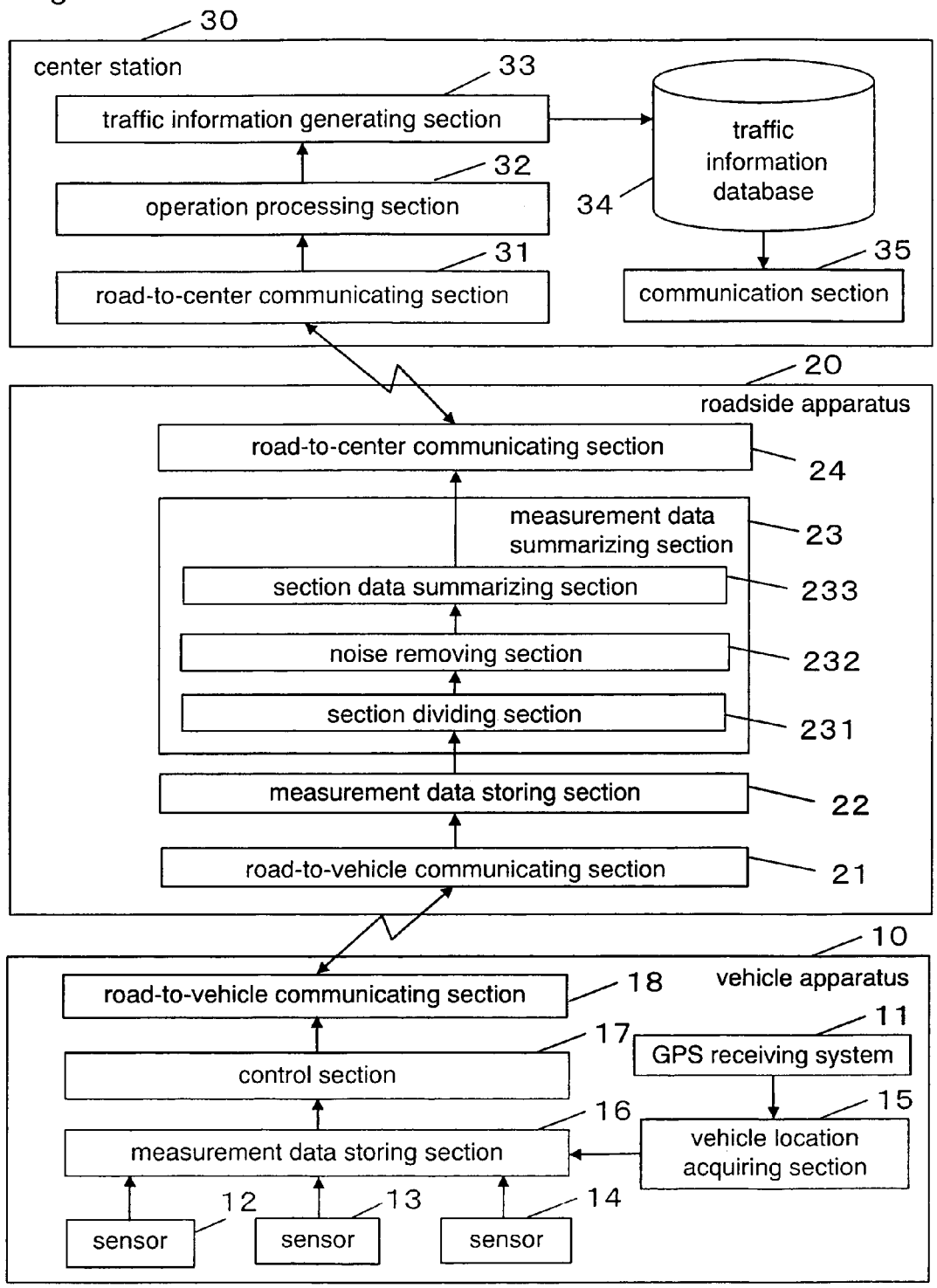
FIG. 1 is a block diagram showing an apparatus and system for processing measurement data in a first embodiment of the present invention.

FIG. 1 is a block diagram showing an apparatus and system for processing measurement data according to an embodiment of the present invention. The measurement-data processing system in this embodiment is arranged with a vehicle apparatus 10 mounted on a vehicle, not shown, a roadside apparatus 20 provided alongside a road where vehicles are to travel and correspondingly to the road, and a center station 30 as a road information summing-up apparatus for totalizing the signals sent from the roadside apparatus 20. The vehicle apparatus 10 and the roadside apparatus 20 are wirelessly connected together by their road-to-vehicle communicating sections 18, 21. The roadside apparatus 20 and the center apparatus 30 are connected directly by their roadside-to-center communicating sections 24, 31 or through a network (not shown), wirelessly or by use of a wire or the both.

The vehicle apparatus 10 has a vehicle-location acquiring section 15 for acquiring a vehicle location according to a signal of from a GPS receiving section 11, and a speed sensor 12, a wiper sensor 13 and a brake sensor 14, for example, for measuring such data as vehicle speed information, acceleration information, wiper information and brake information. The vehicle apparatus 10 further comprises a measurement-data storing section 16 for storing the data acquired from the vehicle-location acquiring section 15 and the measurement data acquired from the speed sensor 12, wiper sensor 13 and brake sensor 14, a control section 17 for reading, in given timing, the vehicle measurement data stored in the measurement-data storing section 16, and a road-to-vehicle communication section 18 for receiving measurement data from the control section 17 and sending it to the roadside apparatus 20.

Incidentally, for the sensors to measure data, desired sensors besides the foregoing sensors are applicable in accordance with the purpose of measurement, e.g. a gyro sensor, a temperature sensor, a humidity sensor, an altitude sensor and a headlight sensor.

The roadside apparatus 20 comprises a road-to-vehicle communicating section 21 for receiving measurement data from the vehicle apparatus 10, a measurement-data storing section 22 for storing measurement data from a plurality of vehicle apparatuses, a measurement-data summarizing section 23 for summarizing the stored data, and a roadside-to-center communicating section 24 for sending to the center station 30 a result of measurement-data summarization by the measurement-data summarizing section 23. Meanwhile, the measurement-data summarizing section 23 has a section dividing section 231 for dividing a section where the vehicle has traveled depending upon the data stored in the measurement-data storing section 22, a noise removing section 232 for removing noise from each of section data, and a section-data summarizing section 233 for summarizing each of section data removed of noise.

The roadside apparatus 20 of this embodiment is set up along a road at a fixed point nearby which vehicles are to travel. Namely, because a latitude and longitude of the roadside apparatus is known, it can communicate with the vehicle apparatus 10 through narrow bands.

The roadside apparatus like this can be configured by optical or radio beacon, DSRC (Dedicated Short Range Communication: narrow-band communication), wireless LAN or the like.

The center station 30 has a roadside-to-center communicating section 31 for receiving the summarization measurement data summarized by the roadside apparatus 20, an operation processing section 32 for statistically operation-processing the summarization measurement data received, a traffic-information generating section 33 for generating traffic information from a statistic operation result at the operation processing section 32, a traffic-information database 34 for storing the traffic information generated, and a communication section 35 for sending the traffic information stored in the traffic-information database 34 to the user or the like. Between the roadside-to-center communicating sections 24, 31, communications may be wireless, wired or through a network.

Figure 2:
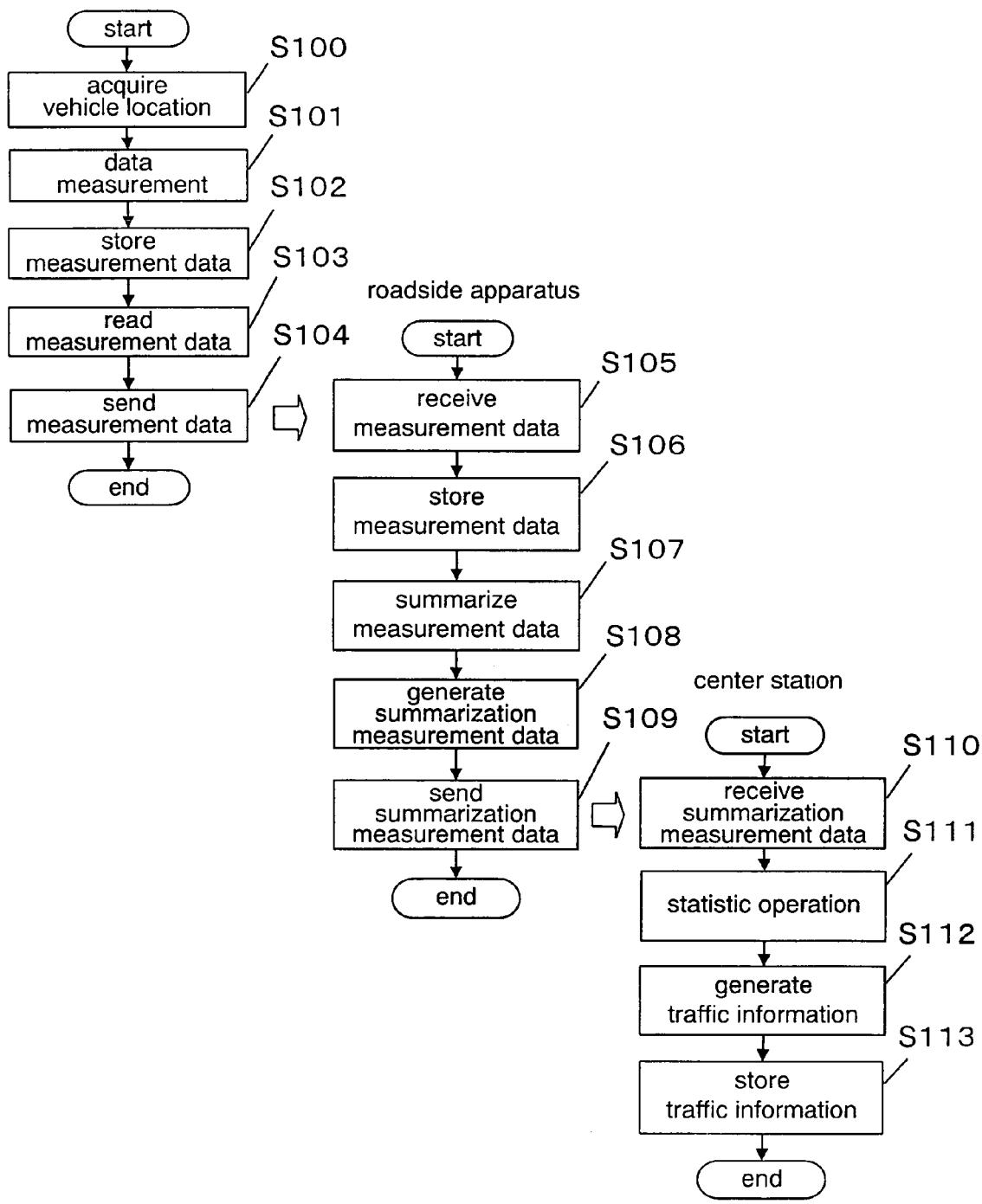
FIG. 2 is a flowchart showing the operation of an apparatus and system for processing measurement data in the first embodiment of the invention.

Now, the operation of this embodiment is explained by using a flowchart shown in FIG. 2.

In the vehicle apparatus 10, the vehicle-location acquiring section 15 acquires a current vehicle location by utilizing a signal of from the GPS receiving section 11 or the like (S100). On the other hand, data measurement is made as to vehicle speed information, wiper-operation information and brake information by means of the speed sensor 12, the wiper sensor 13 and the brake sensor 14 mounted on the vehicle (S101). Those of measurement data as well as the vehicle location information acquired from the vehicle-location acquiring section 15 are stored as vehicle measurement data in the measurement-data storing section 16 (S102).

The measurement data stored includes information of vehicle location, direction, duration, time, temperature, humidity, headlight on/off, side light on/off and turn-signal status, besides the above information. For example, it is possible to know a location and situation of congestion from a vehicle location and speed, rainfall information from wiper information, and snowfall information based on wiper information, temperature information and humidity information. The measurement data stored in the measurement-data storing section 16 is read out in given timing, e.g. at an interval of several seconds, by the control section 17 (S103), and sent by the road-to-vehicle communicating section 18 to the roadside apparatus 20 (S104). A plurality of such vehicles are traveling alongside one roadside apparatus 20. The above operation is carried out on a vehicle-by-vehicle basis. From each vehicle, measurement data is sent to the roadside apparatus 20.

In the roadside apparatus 20, the road-to-vehicle communicating section 21 receives the measurement data sent from each vehicle apparatus 10 (S105). The roadside apparatus 20 receives measurement data in a plurality of vehicles, to store the received data in the measurement-data storing section 22 (S106). The stored measurement data is summarized taking account of similarity by the measurement-data summarizing section 23 (S107).

Namely, the roadside apparatus. 20 is fixed in installation position. Because the vehicles passing the roadside apparatus 20 can be considered the vehicles traveled the road around there, there is a high possibility that those have traveled the similar route. Furthermore, there can be considered high possibility of similarity in travel features. Concerning the measurement data received by one roadside apparatus 20 from a plurality of vehicles, it can be considered highly similar and common in the major part. By summarizing the common part, the measurement-data summarizing section 23 is allowed to decrease the data to be sent to the center station 30 without reducing the effective information. This can further enhance the accuracy of information.

The summarization process of measurement data in the measurement-data summarizing section 23 is executed at a given time interval or each time receiving measurement data in a given number, for example. As a result, summarization measurement data is generated (S108) and outputted to a roadside-to-center communicating section 24. The roadside-to-center communicating section 24 sends the summarization measurement data outputted from the measurement-data summarizing section 23 to the center station 30 (S109). The operation of the measurement-data summarizing section 23 is explained in the later.

In the center station 30, the roadside-to-center communicating section 31 receives the summarization measurement data sent from the roadside apparatus 20 (S110). The center station 30 can gather summarized data in various sections and various points of time because of reception from a plurality of roadside apparatuses. Those of summarized data are statistically operation-processed in the operation processing section 32 (S111).

From a result thereof, a traffic-information generating section 33 generates traffic information about a section and point of time that the vehicle sent the summarized data has traveled (S112). Traffic information includes a degree of congestion and traveling time (passage time) in a certain section, rainfall information, etc. The traffic information generated by the traffic-information generating section 33 is stored in a traffic-information database 34 (S113) so that it can be indirectly or directly offered as required to the user through a communicating section 35 by the utilization of a broadcast or communication media.

Now, the operation of the measurement-data summarizing section 23 is explained in detail. The measurement-data summarizing section 23 analyzes the measurement data of a plurality of vehicles and summarizes the common part thereof, thereby reducing the total amount of data. As noted before, the measurement data as collected by one roadside apparatus 20 is related to a vehicle traveled the road around there, hence highly resembling that of another roadside apparatus 20. Hence, data can be reduced in amount without losing information.

Figure 3:
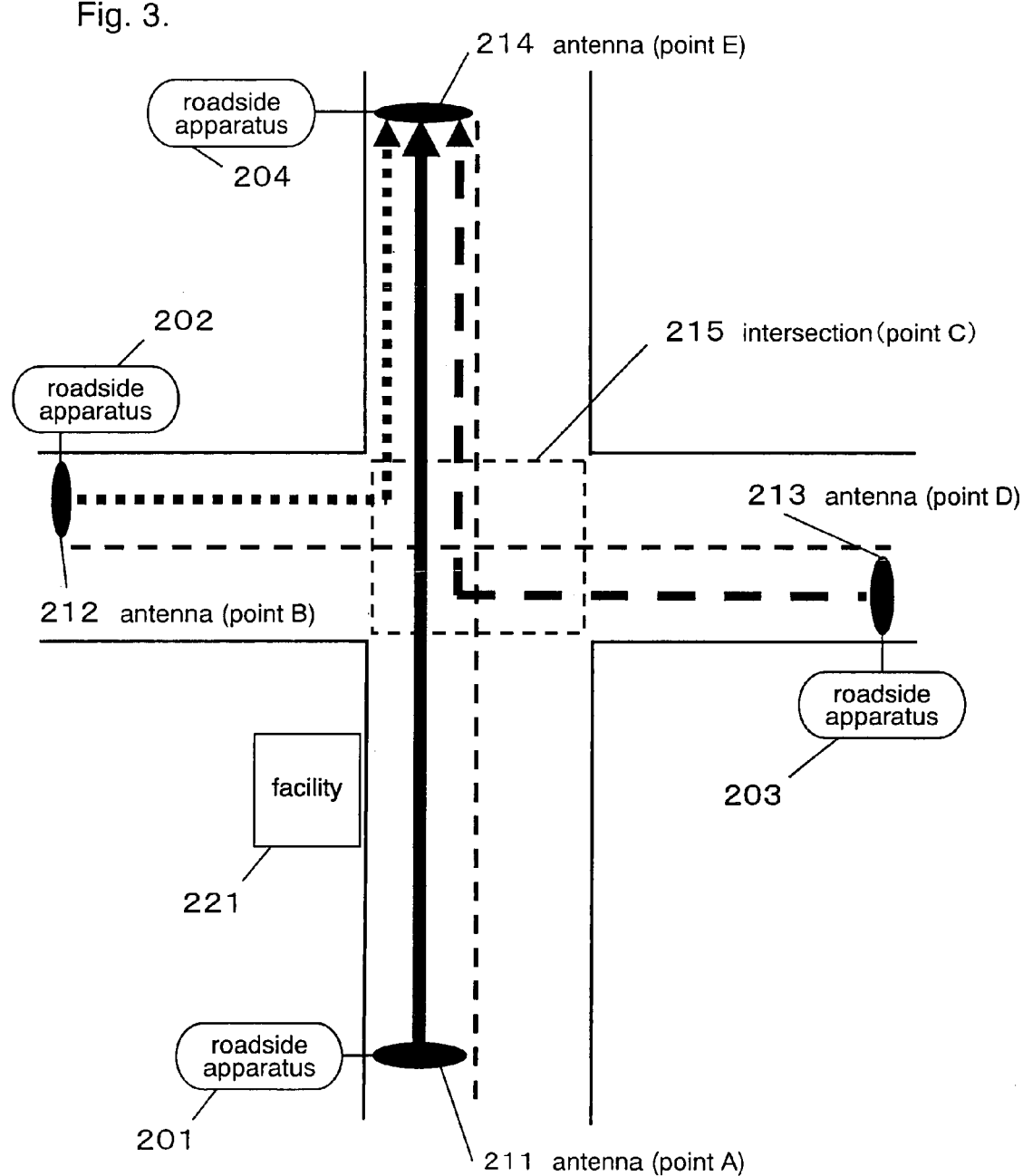
FIG. 3 is a figure showing the arrangement of the roadside apparatus in the first embodiment of the invention.
Figure 4:
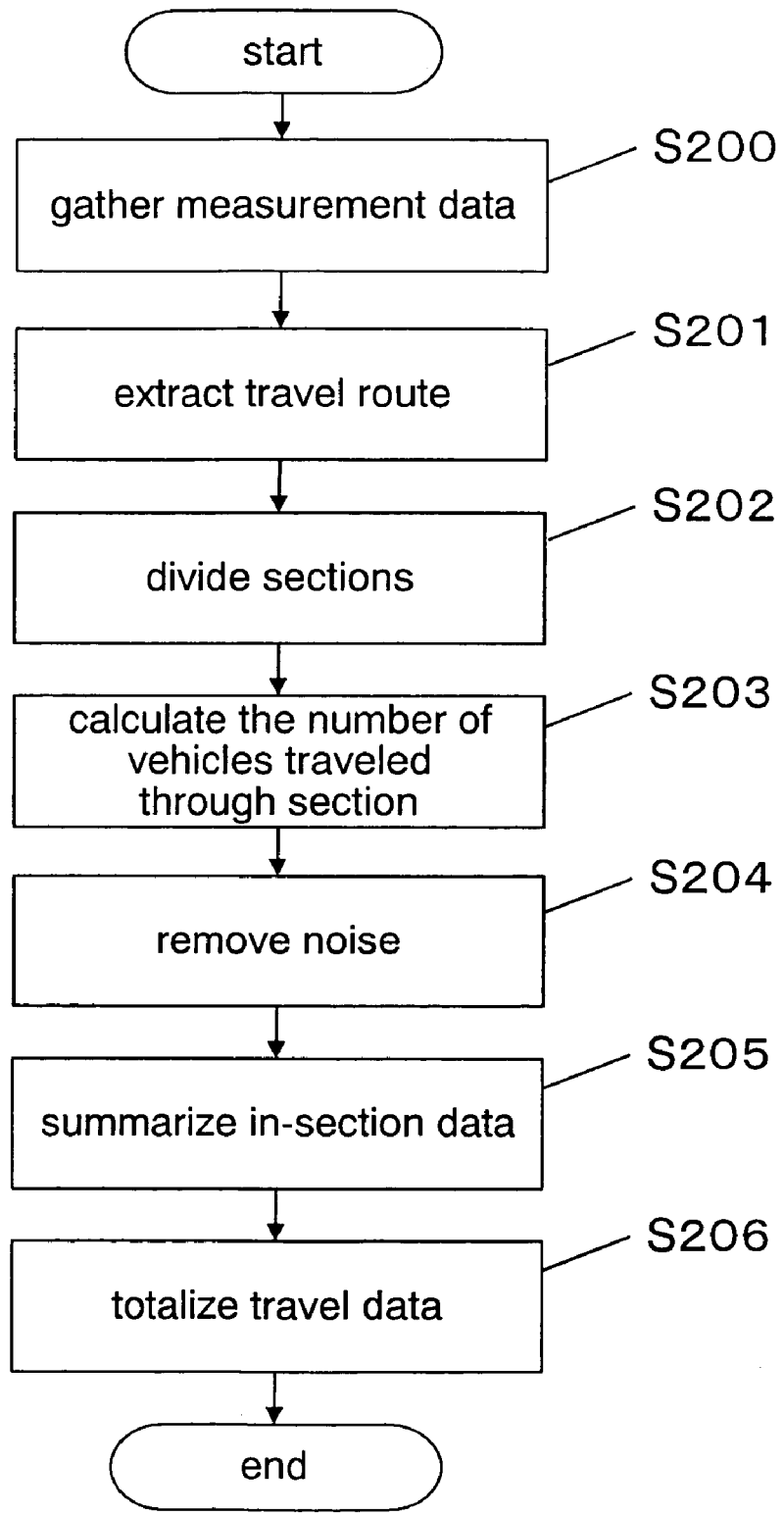
FIG. 4 is a flowchart showing the detailed operation in a measurement data summarizing section of the roadside apparatus in the first embodiment of the invention.

The method of summarizing measurement data is explained by using FIGS. 3 to 5.

FIG. 3 shows an arrangement of a roadside apparatus in one embodiment of the invention. In FIG. 3, roadside apparatuses 201, 202, 203, 204 are set up connected respectively with an antenna 211 for receiving measurement data of from the vehicle passing a point A, an antenna 212 for receiving measurement data of from the vehicle passing a point B, an antenna 213 for receiving measurement data of from the vehicle passing a point D, and an antenna 214 for receiving measurement data of from the vehicle passing a point E. The point C 215 represents an intersection 215.

The vehicle, passed the point A and then to pass the point E, sends, at the point A, measurement data heretofore to the roadside apparatus 201 through the antenna 211. The measurement data on section A–E is sent, at point E, to the roadside apparatus 204 through the antenna 214. Concerning the section A–E over which the vehicle has traveled, there can be considered various methods, including a method of representing it by a preset link number, a method of representing it by a dot string of altitude/longitude, and a method of representing it by an altitude/longitude of point A and a form of the section A–E. However, representation herein may be by any method. Likewise, the measurement data of a section B–E and section D–E is sent, at point E, to the roadside apparatus 204 through the antenna 214.

This embodiment explains on an example that, in FIG. 3, there are eight vehicles traveled the section A–E, five vehicles traveled the section B–C and turned to the left at the point C 215 into the section C–E, and three vehicles traveled the section D–C and turned to the right at the point C 215 into the section C–E.

FIG. 4 is a flowchart showing a detailed operation in the measurement-data summarizing section 23 of the roadside apparatus in this embodiment. In FIG. 4, in the roadside apparatus 204, the road-to-vehicle communicating section 21 collects the measurement data of the above vehicle through the antenna 214 (S200). From the collected measurement data, the section dividing section 231 extracts the vehicle-passed paths A–E, B–E, D–E (S201) and divides the vehicle-passed path into section A–C, section B–C, section D–C and section C–E (S202), to thereby calculates the number of vehicles traveled through each section (S203).

FIG. 5 shows the measurement data of the roadside apparatus 204 in this embodiment. There are calculations that eight vehicles 101–108 traveled through the section A–C, five vehicles 109–113 traveled through the section B–C, three vehicles 114–116 traveled through the section D–C, and sixteen vehicles 101–116 traveled through the section C–E.

Now, in the measurement data gathered, there are those of data greatly different in value from other data, e.g. a vehicle visited a facility on the route or a vehicle stopped in the way and waited for a person. These are removed as noise by a noise removing section 232 (S204).

Namely, FIG. 5 shows the case that the vehicles 101, 106, 108, 110, 111, 114 traveled through the point C (intersection 215) without waiting for a signal while the vehicles 102, 103, 107, 109, 112, 113, 115, 116 traveled through the point C (intersection 215) by waiting for a signal. Accordingly, in case analyzing the measurement data of the section A–C, it can be classified into four groups, i.e. a group of taken 14–16 seconds, a group of taken 43–62 seconds, a vehicle taken 102 seconds and a vehicle taken 404 seconds. It can be presumed that those in the group of 14–16 seconds (vehicles 101, 106, 108) are the vehicles would have traveled the intersection without waiting for a signal. From the mean value (15 seconds) of the relevant data, congestion situation at present can be determined of the road at the section A–C.

Thereafter, the vehicles (vehicles 102, 103, 107) are presumed to have waited for a signal, which have traveled within a time (75 seconds) added of a time (e.g. 60 seconds) corresponding to a wait time for the signal apparatus at point C previously set with a determining threshold with an average travel time (15 seconds) over the foregoing vehicles presumed traveled without waiting for a signal.

On the contrary, the vehicle 104 visited the facility 221 and the vehicle 105 stopped on the way and waited for a person in the section A–C are greatly different from others, in travel time through section A–C, i.e. 404 seconds and 102 seconds, respectively. Accordingly, those are removed as noises prior to carrying out a summarization process. Incidentally, by taking the sampling period of measurement data more precisely, noise removal can be with higher accuracy.

Then, the measurement data removed of noise is summarized on a section-by-section basis, in the section-data summarizing section 233 (S205). Namely, in the section A–C, the measurement data is summarized on the six vehicles except for the two vehicles noise removal has been done, i.e. the measurement data of 14 seconds, 43 seconds, 51 seconds, 16 seconds, 62 seconds and 15 seconds are summarized to obtain summarization measurement data of 33.5 as an average value. Similarly, summarization measurement data is generated one per section, e.g. 38.4 seconds as an average over five vehicles for the section B–C, and 47.3 seconds as an average over three vehicles for the section D–C, and 19.7 seconds as an average over six vehicles for the section C–E.

Finally, the section-based summarization measurement data thus obtained is totalized (S206) and sent to the center station 30 through the roadside-to-center communicating section 24.

By thus analyzing and summarizing a plurality of ones of measurement data, accuracy can be enhanced by removing or so of noise the data greatly different in value from other data, e.g. of the vehicle visited a facility on the route or stopped in the way and waited for a person.

2. Second Exemplary Embodiment

Usually, at a certain intersection, traffic (vehicles traveling) is less in a time zone of early morning or midnight, providing less number of data and resulting in data variation. Meanwhile, in a time zone of commutation and returning home or of holiday forenoon, traffic (vehicles traveling) is in great deal, providing less data variation even at an increased number of data. In some cases, data amount frequently deviates due to inattentive driving at an increased amount of traffic. Namely, traffic information tends to frequently change even on the same road, depending upon the situation thereof. Therefore, for such roads, it is preferred to generate traffic information by taking such events into consideration.

Figure 6:
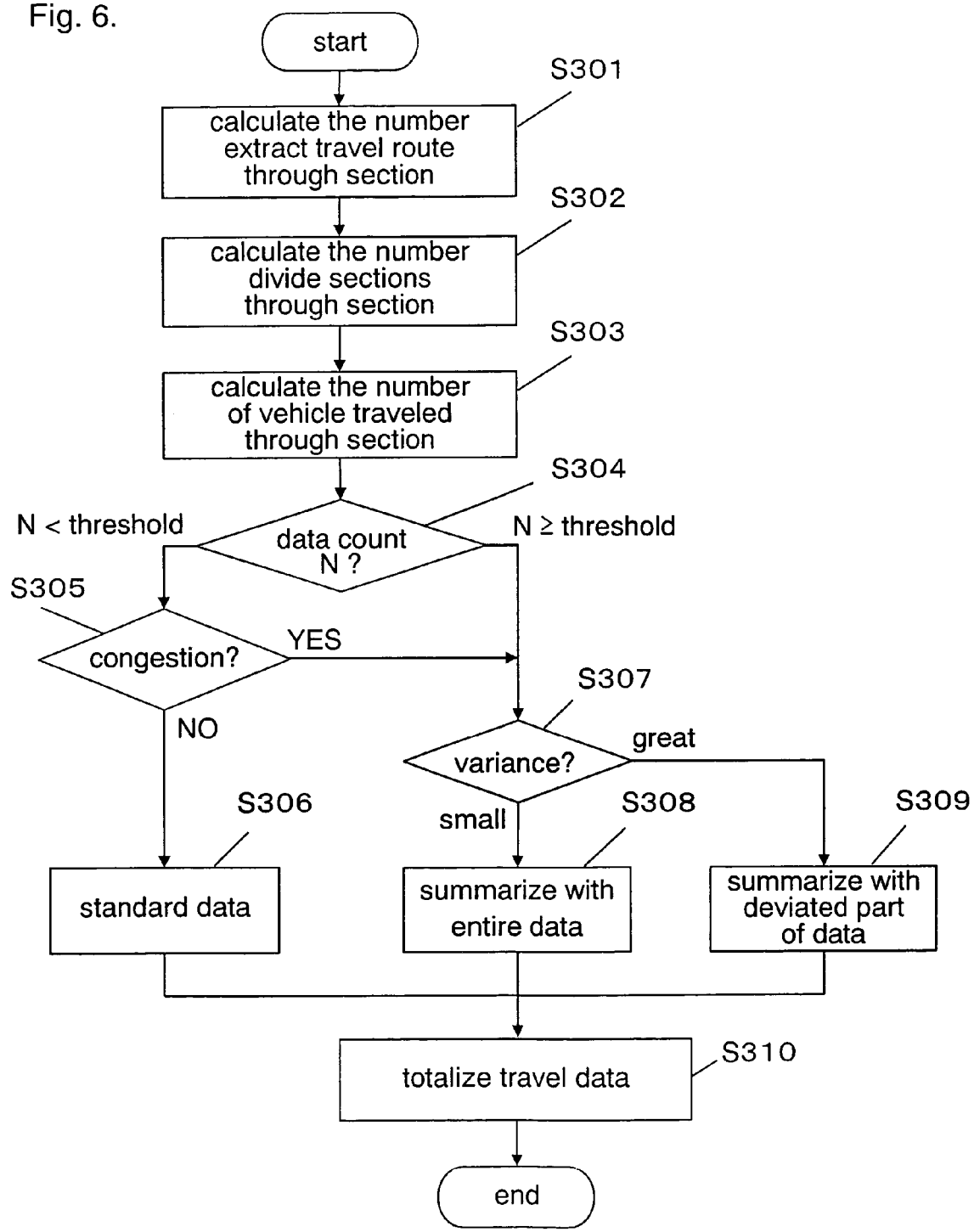
FIG. 6 is a flowchart showing the detailed operation in a measurement data summarizing section of the roadside apparatus in the second embodiment of the invention.

FIG. 6 shows an operation flowchart of the measurement-data summarizing section 23 in another embodiment of the invention, which takes the above into consideration.

In FIG. 6, a traveling route is first extracted (S301) similarly to the case of FIG. 5. The measurement data is divided into section-based data (S302), to calculate the number of traveling vehicles through each section (data count) (S303).

Then, it is determined whether the calculated data count is greater or smaller than a predetermined threshold (S304). For example, when data count (N) is greater, e.g. data count (N) is five or more, it can be considered that traffic is equal to or greater than a given degree. Hence, the data is highly reliable. On the other hand, when data count (N) is smaller, e.g. under five, it can be considered that necessary sufficient data could not be gathered because of light traffic. Thus, the data is less reliable.

Meanwhile, in an excessive congestion, it can be considered less in the number of the vehicles passing the roadside apparatus 20 despite data is less in the number. In this case, it is determined whether lying within a congestion section or not from speed information, etc. of measurement data (S305). In the case of within a congestion section, despite data count is less, other vehicles are considered in the similar traveling situation. Hence, data is highly reliable.

In the case that determination at S305 is as a light traffic section instead of a congestion, standard data is taken as data on the section (S306). Here, standard data is data to be calculated on the assumption of traveling at a speed defined as the standard, e.g. at a statutory speed or at a speed of 30 Km per hour on the usual road and at a speed of 80 Km per hour on the expressway.

In the case it is determined at S304 that data count (N) is equal to or greater than a threshold or determined at S305 that in a congestion section, a summarization process is made based on the gathered measurement data. At first, the measurement data is examined for variance (S307). When the variance is small, the entire data is considered as in the similar traveling situation, to generate summarization measurement data from the entire data (S308). On the other hand, when the variance is great, it can be considered that data is great in dispersion, i.e. noise is contained. Accordingly, summarization measurement data is generated on the basis of the data in a range that data values are in deviation (S309). This makes it possible to remove the data that is to turn into noise greatly variant, e.g. on parking/stopping vehicle. By the above process, measurement data can be generated that is highly reliable in each section.

Incidentally, when a variance is examined to generate summarization measurement data, suitably determined are values around the peak value of variant measurement data to thereby calculate a mean value over measurement data existing between those. When the peak values are dispersed into a plurality of maximums/minimums, calculated is a mean value of a variance greater in number of measurement data or a mean value of a variance having a maximum peak value. Thus, a variety of methods are to be applied.

Finally, by totalizing the measurement data generated on a section-by-section basis (S310), it is possible to obtain summarization measurement data that summarization is made over a plurality of ones of measurement data gathered in the roadside apparatus 204. This summarization measurement data is sent to the center station 30 through the road-to-center communication section 24.

Incidentally, although the data gathering method in the above embodiment was implemented by determining a mean value, the invention is not limited to this but may use other statistic techniques.

As described above, in this embodiment, by carrying out a summarization process taking noise and variance into consideration, it is possible to generate reliable measurement data reflected with a plurality of features of measurement data in each section.

3. Third Exemplary Embodiment

The embodiment heretofore explained the measurement-data processing system arranged with the vehicle apparatus 10, the roadside apparatus 20 and the center station 30. However, the arrangement may be by setting up an intermediate station between the roadside apparatus 20 and the center apparatus 30.

Figure 7:
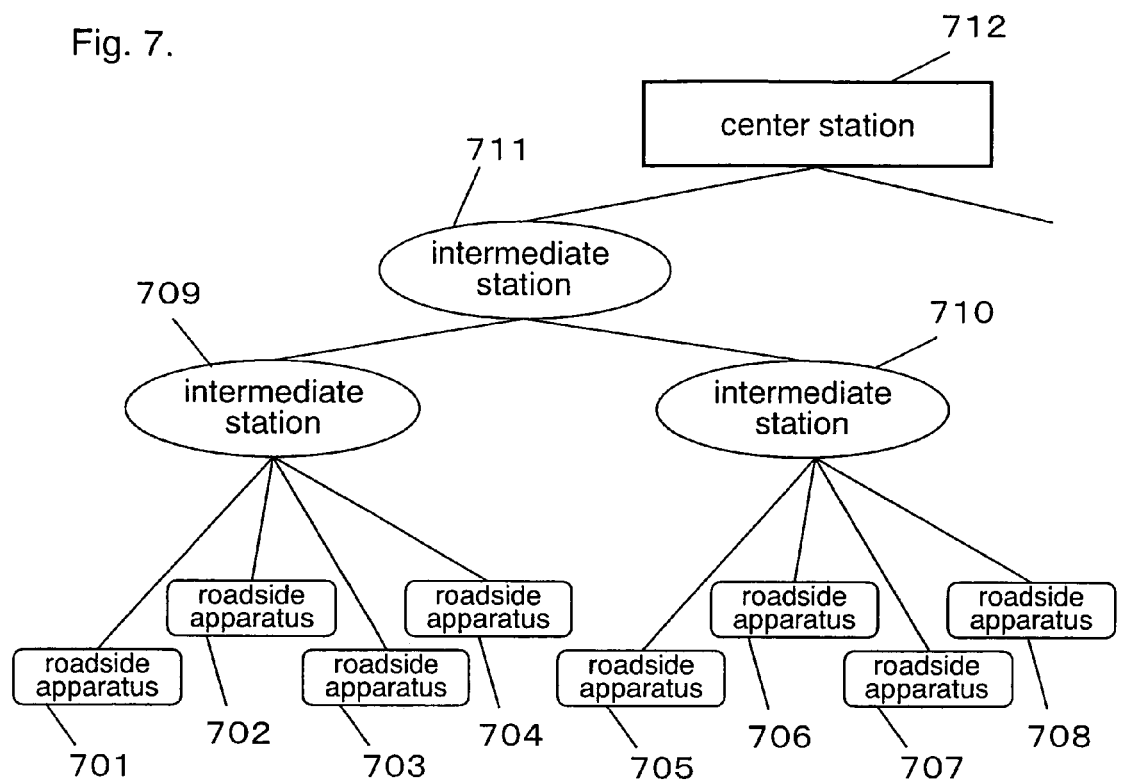
FIG. 7 is a block diagram showing an apparatus and system for processing measurement data in the third embodiment of the present invention.

FIG. 7 is an arrangement diagram showing still another embodiment of the invention. Using FIG. 7, explanation is made on a measurement-data processing system having an intermediate station.

In FIG. 7, roadside apparatuses 701–708 are installed along the road where vehicles are to pass. Intermediate stations 709 and 710 are to receive respective ones of summarization measurement data sent from the roadside apparatuses 701–704 and the roadside apparatuses 705–708. Furthermore, an intermediate station 711 is to receive the summarization measurement data received at the intermediate station 709 and 710, and sends it to a center station 712. Namely, the intermediate stations 709–711 are arranged in a hierarchical fashion.

Here, the roadside apparatus 701–708 and the intermediate station 709–711 are configured similarly to the roadside apparatus 20 in FIG. 1. However, from a roadside-to-center communicating section 24 of the roadside apparatus 701–708, summarization measurement data is sent to the intermediate stations 709 and 710. At the intermediate stations 709 and 710, the summarization measurement data is further summarized and then sent to the intermediate station 711. Meanwhile, at the intermediate station 711, the summarization measurement data is also summarized and then sent to the center station 712.

The center station 712 has a configuration similar to that of the center station 30 in FIG. 1, to receive the summarization measurement data that have been summarized by and sent from the intermediate stations 709–711 thereby generating traffic information.

Namely, in the embodiment, the intermediate stations 709 and 711 also summarize the summarization measurement data of from the roadside apparatuses 701–708.

Figure 8:
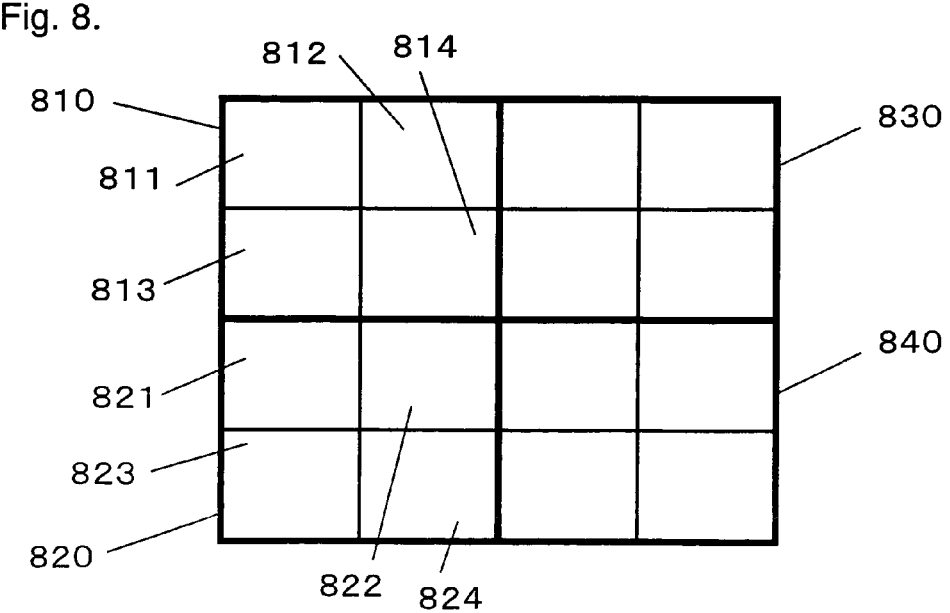
FIG. 8 is a figure showing the arrangement of a roadside apparatus in the third embodiment of the invention.

FIG. 8 is a figure showing the regions where the roadside apparatus 701–708 of this embodiment are arranged. An area 810 is constituted by minimum-level areas 811–814 while an area 820 is constituted by minimum-level areas 821–824. Similarly, areas 830, 840 are also constituted by minimum-level areas. The roadside apparatuses 701–704 are respectively arranged in the areas 811–814 while the roadside apparatuses 705–708 are respectively arranged in the areas 821–824. The measurement data received by the roadside apparatus 701–704 is sent to the intermediate station 709. The intermediate station 709 summarizes the measurement data collected within the area 810. The measurement data received by the roadside apparatus 705–708 is sent to the intermediate station 710. The intermediate station 710 summarizes the measurement data collected within the area 820. Similarly, the measurement data collected within the area 830 or 840 is gathered by the intermediate station provided correspondingly to the area.

With this arrangement, the intermediate stations 709 and 710 and further the intermediate station 711 are allowed to implement a summarization process based on area or on road type, and in accordance with road network.

Namely, in case the measurement data of from the roadside apparatus 701–708 is summarized area by area, traffic information is obtained on each area. Meanwhile, by summarizing the measurement data separately between the usual road and the expressway, traffic information is obtained based on the type of road. Similarly, by summarizing the measurement data obtained along a particular road network, traffic information is obtained conforming to the road network. Meanwhile, by setting up the roadside apparatuses 701–704 along a usual road and the roadside apparatuses 705–708 along an expressway, the measurement data from the roadside apparatuses per se can be summarized as measurement data corresponding to the type of road.

Although this embodiment effected a summarization process by the roadside apparatus 701–708 and intermediate station 709–711, the invention is not limited to this, e.g. the intermediate station 709–711 may have a function solely to transfer the summarization measurement data summarized in the roadside apparatus 701–708 to the center station 712.

Meanwhile, although this embodiment did not implement a summarization process at the center station 712, the invention is not limited to this, e.g. summarization process can be made also in the center station 712.

Namely, this can be selected depending upon situation, e.g. in a case that adjacent or overlapped are the moving regions for the mobiles to be measured.

Incidentally, although the above embodiment explained with the case the mobiles were vehicles, the invention is not limited to this, those may be humans, animals, ships or trains. Meanwhile, the passage may be a railway, on water or on land, such as grassy land or sands, instead of road provided that roaming is allowed.

Furthermore, in case an antenna is set up for the passage in a manner to receive measurement data from a mobile, there is not always a need to provide a roadside apparatus alongside the passage.

As explained above, a measurement data processing apparatus of the present invention comprises: receiving means for receiving measurement data measured at a mobile; measurement data storing means for storing measurement data received by the receiving means; and measurement data summarizing means for summarizing measurement data stored by the measurement data storing means. Accordingly, it is possible to reduce the total amount of summarization measurement data to be sent to another apparatus, relative to the total amount of measurement data received from the mobile.

Meanwhile, a measurement data processing system of the invention has a mobile apparatus mounted on a mobile and for measuring data at the mobile, and a measurement data processing apparatus for processing data measured at the mobile, the mobile apparatus comprising: measurement data acquiring means for acquiring measurement data measured at the mobile; and mobile transmitting means for sending the measurement data acquired by the measurement data acquiring means to the measurement data processing apparatus; and the measurement data processing apparatus comprising: data processing apparatus receiving means for receiving the measurement data sent from the mobile apparatus; measurement data storing means for storing the measurement data received by the data processing apparatus receiving means; and measurement data summarizing means for summarizing the measurement data stored in the measurement data storing means. Accordingly, even in the event of spread of the mobile, it is possible to reduce the total amount of summarization measurement data to be sent to the center apparatus, relative to the total amount of measurement data received from the mobile.

Furthermore, a measurement data processing system of the invention has a mobile apparatus mounted on a mobile and for measuring data at the mobile, a first measurement data processing apparatus for processing the data measured at the mobile, and a second measurement data processing apparatus for processing the data processed by the first measurement data processing apparatus, the mobile apparatus comprising: measurement data acquiring means for acquiring measurement data measured at the mobile; and mobile transmitting means for sending the measurement data acquitted by the measurement data acquiring means to the first measurement data processing apparatus; the first measurement data processing apparatus comprising: first processing apparatus receiving means for receiving the measurement data sent from the mobile apparatus; first processing apparatus storing means for storing the measurement data received by the first processing apparatus receiving means; first processing apparatus summarizing means for summarizing the measurement data stored in the first processing apparatus storing means; and first processing apparatus transmitting means for sending the summarization measurement data summarized by the first processing apparatus summarizing means to the second measurement data processing apparatus; the second measurement data processing apparatus comprising: second processing apparatus receiving means for receiving the summarization measurement data sent from the first measurement data processing apparatus; and processing means for processing the summarization measurement data received by the second processing apparatus receiving means. Accordingly, even in the event of spread of the mobile, it is possible for the first measurement data processing apparatus to reduce the total amount of summarization measurement data to be sent to the second measurement data processing apparatus, relative to the total amount of measurement data received from the mobile.

Furthermore, a measurement data processing system of the invention has a mobile apparatus mounted on a mobile and for measuring data at the mobile, a first measurement data processing apparatus provided correspondingly to a movement region where the mobile is to move, and a second measurement data processing apparatus for processing the data processed by the first measurement data processing apparatus, the mobile apparatus comprising: measurement data acquiring means for acquiring the measurement data measured at the mobile; and mobile transmitting means for sending the measurement data acquitted by the measurement data acquiring means to the first measurement data processing apparatus; the first measurement data processing apparatus comprising: first processing apparatus receiving means for receiving measurement data sent from the mobile apparatus; first processing apparatus storing means for storing the measurement data received by the first processing apparatus receiving means; first processing apparatus summarizing means for summarizing the measurement data stored in the first processing apparatus storing means; and first processing apparatus transmitting means for sending the summarization measurement data summarized by the first processing apparatus summarizing means to the second measurement data processing apparatus; the second measurement data processing apparatus comprising: second processing apparatus receiving means for receiving the summarization measurement data sent from the first measurement data processing apparatus; and second processing apparatus storing means for storing the summarization measurement data received by the second processing apparatus receiving means; and second processing apparatus summarizing means for further summarizing the summarization measurement data stored by the second processing apparatus storing means. Accordingly, even in the event of spread of the mobile, it is possible to further reduce the total amount of measurement data by further summarizing the summarization measurement data summarized in the first measurement data processing apparatus in the second measurement data processing apparatus, relative to the total amount of measurement data received from the mobile.

What is claimed is:

1. A measurement data processing apparatus comprising:
   receiving means for receiving measurement data measured at a mobile;
   measurement data storing means for storing measurement data received by the receiving means; and
   measurement data summarizing means for summarizing measurement data stored by the measurement data storing means;
   wherein the measurement data summarizing means comprises section dividing means for extracting a movement path of the mobile from the measurement data and dividing the movement path extracted into sections, and section data summarizing means for summarizing the measurement data based on the section divided.

2. A measurement data processing apparatus comprising:
   receiving means for receiving measurement data measured at a mobile;
   measurement data storing means for storing measurement data received by the receiving means; and
   measurement data summarizing means for summarizing measurement data stored by the measurement data storing means;
   wherein the measurement data summarizing means comprises noise removing means for removing noise contained in the measurement data.

3. A measurement data processing system having a mobile apparatus mounted on a mobile and for measuring data at the mobile, and a measurement data processing apparatus for processing data measured at the mobile,
   the mobile apparatus comprising:
      measurement data acquiring means for acquiring measurement data measured at the mobile; and
      mobile sending means for sending the measurement data acquired by the measurement data acquiring means to the measurement data processing apparatus; and
   the measurement data processing apparatus comprising:
      data processing apparatus receiving means for receiving the measurement data sent from the mobile apparatus;
      measurement data storing means for storing the measurement data received by the data processing apparatus receiving means; and
      measurement data summarizing means for summarizing the measurement data stored in the measurement data storing means;
   wherein the measurement data summarizing means comprises section dividing means for extracting a movement path of the mobile from the measurement data and dividing the movement path extracted into sections, and section data summarizing means for summarizing the measurement data based on the section divided.

4. A measurement data processing system having a mobile apparatus mounted on a mobile and for measuring data at the mobile, and a measurement data processing apparatus for processing data measured at the mobile,
   the mobile apparatus comprising:
      measurement data acquiring means for acquiring measurement data measured at the mobile; and
      mobile sending means for sending the measurement data acquired by the measurement data acquiring means to the measurement data processing apparatus; and
   the measurement data processing apparatus comprising:
      data processing apparatus receiving means for receiving the measurement data sent from the mobile apparatus;
      measurement data storing means for storing the measurement data received by the data processing apparatus receiving means; and
      measurement data summarizing means for summarizing the measurement data stored in the measurement data storing means;
   wherein the measurement data summarizing means comprises noise removing means for removing noise contained in the measurement data.

5. A measurement data processing system having a mobile apparatus mounted on a mobile and for measuring data at the mobile, a first measurement data processing apparatus for processing the data measured at the mobile, and a second measurement data processing apparatus for processing the data processed by the first measurement data processing apparatus, the mobile apparatus comprising:
    measurement data acquiring means for acquiring measurement data measured at the mobile; and
    mobile transmitting means for sending the measurement data acquitted by the measurement data acquiring means to the first measurement data processing apparatus;

the first measurement data processing apparatus comprising:
    first processing apparatus receiving means for receiving the measurement data sent from the mobile apparatus;
    first processing apparatus storing means for storing the measurement data received by the first processing apparatus receiving means;
    first processing apparatus summarizing means for summarizing the measurement data stored in the first processing apparatus storing means; and
    first processing apparatus transmitting means for sending the summarization measurement data summarized by the first processing apparatus summarizing means to the second measurement data processing apparatus;

the second measurement data processing apparatus comprising:
    second processing apparatus receiving means for receiving the summarization measurement data sent from the first measurement data processing apparatus; and processing means for processing the summarization measurement data received by the second processing apparatus receiving means;

wherein the first processing apparatus summarizing means comprises a section dividing means for extracting a movement path of the mobile from the measurement data and dividing the movement path extracted into sections, and section data summarizing means for summarizing the measurement data based on the section divided.

6. A measurement data processing system having a mobile apparatus mounted on a mobile and for measuring data at the mobile, a first measurement data processing apparatus for processing the data measured at the mobile, and a second measurement data processing apparatus for processing the data processed by the first measurement data processing apparatus, the mobile apparatus comprising:
    measurement data acquiring means for acquiring measurement data measured at the mobile; and
    mobile transmitting means for sending the measurement data acquitted by the measurement data acquiring means to the first measurement data processing apparatus;

the first measurement data processing apparatus comprising:
    first processing apparatus receiving means for receiving the measurement data sent from the mobile apparatus;
    first processing apparatus storing means for storing the measurement data received by the first processing apparatus receiving means;
    first processing apparatus summarizing means for summarizing the measurement data stored in the first processing apparatus storing means; and first processing apparatus transmitting means for sending the summarization measurement data summarized by the first processing apparatus summarizing means to the second measurement data processing apparatus;

the second measurement data processing apparatus comprising:
    second processing apparatus receiving means for receiving the summarization measurement data sent from the first measurement data processing apparatus; and processing means for processing the summarization measurement data received by the second processing apparatus receiving means;

wherein the first processing apparatus summarizing means comprises noise removing means for removing noise contained in the measurement data.

7. A measurement data processing system having a mobile apparatus mounted on a mobile and for measuring data at the mobile, a first measurement data processing apparatus provided correspondingly to a movement region where the mobile is to move, and a second measurement data processing apparatus for processing the data processed by the first measurement data processing apparatus, the mobile apparatus comprising:
    measurement data acquiring means for acquiring measurement data measured at the mobile; and
    mobile transmitting means for sending the measurement data acquitted by the measurement data acquiring means to the first measurement data processing apparatus;

the first measurement data processing apparatus comprising:
    first processing apparatus receiving means for receiving the measurement data sent from the mobile apparatus;
    first processing apparatus storing means for storing the measurement data received by the first processing apparatus receiving means;
    first processing apparatus summarizing means for summarizing the measurement data stored in the first processing apparatus storing means; and
    first processing apparatus transmitting means for sending the summarization measurement data summarized by the first processing apparatus summarizing means to the second measurement data processing apparatus;

the second measurement data processing apparatus comprising:
    second processing apparatus receiving means for receiving the summarization measurement data sent from the first measurement data processing apparatus; and second processing apparatus storing means for storing the summarization measurement data received by the second processing apparatus receiving means; and second processing apparatus summarizing means for further summarizing the summarization measurement data stored by the second processing apparatus storing means;

wherein the first or second processing apparatus summarizing means comprises section dividing means for extracting a movement path of the mobile from the measurement data and dividing the movement path extracted into sections, and section data summarizing means for summarizing the measurement data based on the section divided.

8. A measurement data processing system having a mobile apparatus mounted on a mobile and for measuring data at the mobile, a first measurement data processing apparatus provided correspondingly to a movement region where the mobile is to move, and a second measurement data processing apparatus for processing the data processed by the first measurement data processing apparatus, the mobile apparatus comprising:

measurement data acquiring means for acquiring measurement data measured at the mobile; and mobile transmitting means for sending the measurement data acquitted by the measurement data acquiring means to the first measurement data processing apparatus;

the first measurement data processing apparatus comprising:

first processing apparatus receiving means for receiving the measurement data sent from the mobile apparatus;

first processing apparatus storing means for storing the measurement data received by the first processing apparatus receiving means;

first processing apparatus summarizing means for summarizing the measurement data stored in the first processing apparatus storing means; and first processing apparatus transmitting means for sending the summarization measurement data summarized by the first processing apparatus summarizing means to the second measurement data processing apparatus;

the second measurement data processing apparatus comprising:

second processing apparatus receiving means for receiving the summarization measurement data sent from the first measurement data processing apparatus; and second processing apparatus storing means for storing the summarization measurement data received by the second processing apparatus receiving means; and second processing apparatus summarizing means for further summarizing the summarization measurement data stored by the second processing apparatus storing means;

wherein the first or second processing apparatus summarizing means comprises noise removing means for removing noise contained in the measurement data.

* * * * *